United States Patent
Wang et al.

(10) Patent No.: US 9,292,073 B2
(45) Date of Patent: Mar. 22, 2016

(54) POWER MANAGEMENT USING RELATIVE ENERGY BREAK-EVEN TIME

(71) Applicants: Ren Wang, Portland, OR (US); Christian Maciocco, Portland, OR (US); Jr-Shian Tsai, Portland, OR (US); Rajeev D. Muralidhar, Bangalore (IN); Harinarayanan Seshadri, Bangalore (IN); Tsung-Yuan Tai, Portland, OR (US); Mesut A. Ergin, Hillsboro, OR (US); Alexander W. Min, Portland, OR (US)

(72) Inventors: Ren Wang, Portland, OR (US); Christian Maciocco, Portland, OR (US); Jr-Shian Tsai, Portland, OR (US); Rajeev D. Muralidhar, Bangalore (IN); Harinarayanan Seshadri, Bangalore (IN); Tsung-Yuan Tai, Portland, OR (US); Mesut A. Ergin, Hillsboro, OR (US); Alexander W. Min, Portland, OR (US)

(73) Assignee: Intel Corporation, Santa Clara, CA (US)

(*) Notice: Subject to any disclaimer, the term of this patent is extended or adjusted under 35 U.S.C. 154(b) by 363 days.

(21) Appl. No.: 13/688,941

(22) Filed: Nov. 29, 2012

(65) Prior Publication Data
US 2013/0138985 A1    May 30, 2013

(30) Foreign Application Priority Data

Nov. 29, 2011 (IN) .......................... 3434/DEL/2011

(51) Int. Cl.
*G06F 1/00* (2006.01)
*G06F 1/32* (2006.01)

(52) U.S. Cl.
CPC ............ *G06F 1/3234* (2013.01); *G06F 1/3206* (2013.01); *G06F 1/3209* (2013.01); *G06F 1/3228* (2013.01); *G06F 1/32* (2013.01); *G06F 1/3203* (2013.01)

(58) Field of Classification Search
CPC ........ G06F 1/32; G06F 1/3203; G06F 1/3206
USPC .......................................... 713/300, 320, 323
See application file for complete search history.

(56) References Cited

U.S. PATENT DOCUMENTS

| | | | |
|---|---|---|---|
| 5,832,286 A | 11/1998 | Yoshida | |
| 6,457,082 B1 | 9/2002 | Zhang et al. | |
| 6,711,644 B1 | 3/2004 | Accapadi et al. | |
| 7,093,141 B2 | 8/2006 | Elnozahy et al. | |
| 7,454,632 B2 | 11/2008 | Kardach et al. | |
| 7,577,856 B2 | 8/2009 | Oshins et al. | |

(Continued)

FOREIGN PATENT DOCUMENTS

| | | |
|---|---|---|
| CN | 1508652 A | 6/2004 |
| CN | 101198923 A | 6/2008 |

(Continued)

OTHER PUBLICATIONS

Office Action received for Chinese Patent Application No. 201180002743.7, mailed on Aug. 22, 2014, 9 pages of Office Action including 4 pages of English translation.

(Continued)

*Primary Examiner* — Michael J Brown
(74) *Attorney, Agent, or Firm* — Jordan IP Law, LLC

(57) ABSTRACT

Systems and methods may provide for determining an absolute energy break-even time for a first low power state with respect to a current state of a system. A relative energy break-even time may also be determined for the first low power state with respect to a second low power state based on at least in part the absolute energy break-even time. In addition, an operating state may be selected for the system based on at least in part the relative energy break-even time.

29 Claims, 2 Drawing Sheets

(56) References Cited

U.S. PATENT DOCUMENTS

| | | |
|---|---|---|
| 8,024,590 B2 | 9/2011 | Song et al. |
| 8,195,750 B1 | 6/2012 | Bakhmutov |
| 8,279,790 B2 | 10/2012 | Wang et al. |
| 8,468,601 B1 | 6/2013 | Bakhmutov |
| 8,599,729 B2 | 12/2013 | Gobriel et al. |
| 8,601,296 B2 | 12/2013 | Jeyaseelan et al. |
| 8,612,998 B2 | 12/2013 | Wang et al. |
| 8,635,469 B2 | 1/2014 | Wang et al. |
| 2006/0075347 A1 | 4/2006 | Rehm |
| 2007/0201559 A1 | 8/2007 | He |
| 2008/0168452 A1 | 7/2008 | Molaro et al. |
| 2008/0222311 A1 | 9/2008 | Lee et al. |
| 2009/0083551 A1 | 3/2009 | Finkelstein et al. |
| 2009/0150696 A1 | 6/2009 | Song et al. |
| 2010/0077107 A1 | 3/2010 | Lee et al. |
| 2010/0083017 A1* | 4/2010 | Fulkerson et al. ............ 713/320 |
| 2010/0153590 A1 | 6/2010 | Hsin et al. |
| 2010/0169683 A1 | 7/2010 | Wang et al. |
| 2011/0069649 A1 | 3/2011 | Gobriel et al. |
| 2011/0154080 A1* | 6/2011 | Wang .................... G06F 1/3228 713/323 |
| 2011/0161627 A1* | 6/2011 | Song et al. ...................... 712/30 |
| 2011/0222397 A1 | 9/2011 | Wang et al. |
| 2012/0079304 A1 | 3/2012 | Weissmann et al. |
| 2012/0079482 A1 | 3/2012 | Wang et al. |

FOREIGN PATENT DOCUMENTS

| | | |
|---|---|---|
| CN | 101458558 A | 6/2009 |
| JP | 2006072698 A | 3/2006 |
| JP | 2009251967 A | 10/2009 |
| JP | 20120003691 A | 1/2012 |
| JP | 20120503257 A | 2/2012 |
| WO | 03063002 A1 | 7/2003 |
| WO | 2012040068 A1 | 3/2012 |

OTHER PUBLICATIONS

Office Action received for Korean Patent Application No. 20137007334, mailed on Apr. 30, 2014, 1 page of English translation only.

International Search Report and Written Opinion received for PCT Patent Application No. PCT/US2013/048765, mailed on Mar. 31, 2014, 12 pages.

Office Action received for Japanese Patent Application No. 2013529384, mailed on Apr. 8, 2014, 6 pages of Office Action including 3 pages of English translation.

Office Action received for Chinese Patent Application No. 201180002743.7, mailed on Jan. 16, 2014, 15 pages of Office Action including 4 pages of English translation.

International Search Report received for PCT Patent Application No. PCT/US2011/052045, mailed on Feb. 28, 2012, 3 pages.

Written Opinion received for PCT Patent Application No. PCT/US2011/052045, mailed on Feb. 28, 2012, 4 pages.

International Preliminary Report on Patentability received for PCT Patent Application No. PCT/US2011/052045, mailed on Mar. 26, 2013, 5 pages.

Office Action received for Chinese Patent Application No. 201210488689.8, mailed on Feb. 28, 2015, 21 pages of Office Action including 9 pages of English translation.

* cited by examiner

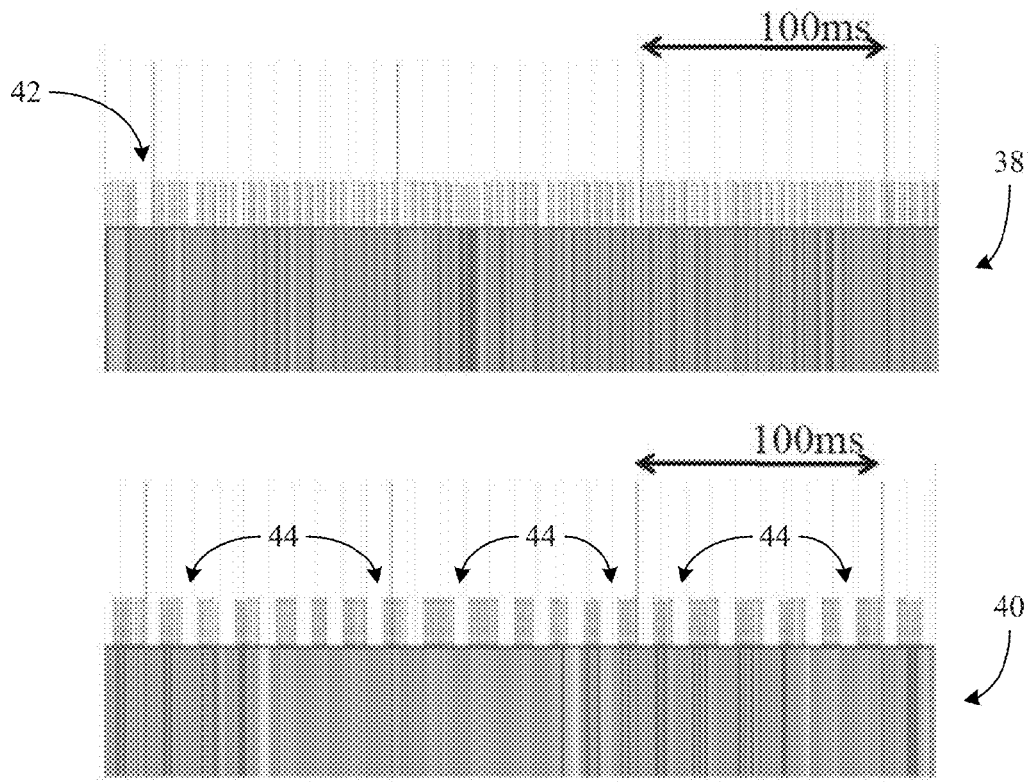
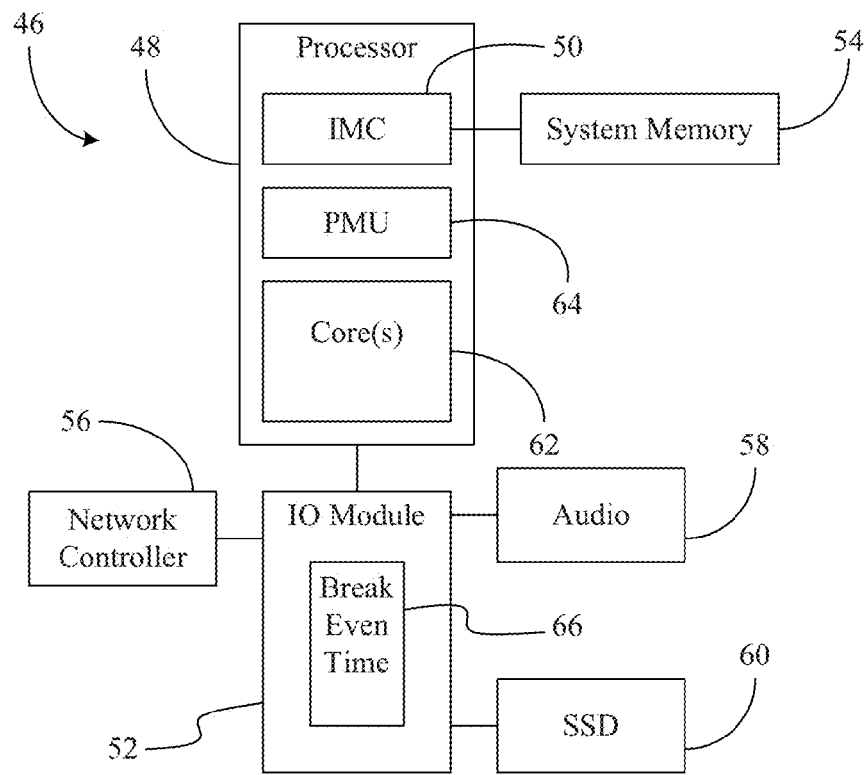
FIG. 3
FIG. 4

POWER MANAGEMENT USING RELATIVE ENERGY BREAK-EVEN TIME

CROSS-REFERENCE TO RELATED APPLICATIONS

The present application is related to U.S. patent application Ser. No. 12/888,855, filed on Sep. 23, 2010, and U.S. patent application Ser. No. 12/317,967, filed on Dec. 31, 2008.

BACKGROUND

1. Technical Field

Embodiments generally relate to power management in computing platforms. More particularly, embodiments relate to the use of relative energy break-even times to select low power states for computing platforms.

2. Discussion

In conventional mobile computing platforms, low power states may be used to reduce power consumption and extend battery life. The determination of whether to enter a given low power state may be limited to an "absolute" energy break-even time approach in which the determination is made relative only to the option of remaining in the active state. Such an approach may have a negative impact on energy efficiency and performance in certain circumstances.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a plot of an example of a conventional break event sequence and a break event sequence as a result of break event coalescing; and FIG. 4 is a block diagram of an example of a computing platform according to an embodiment.

DETAILED DESCRIPTION

Figure 1:
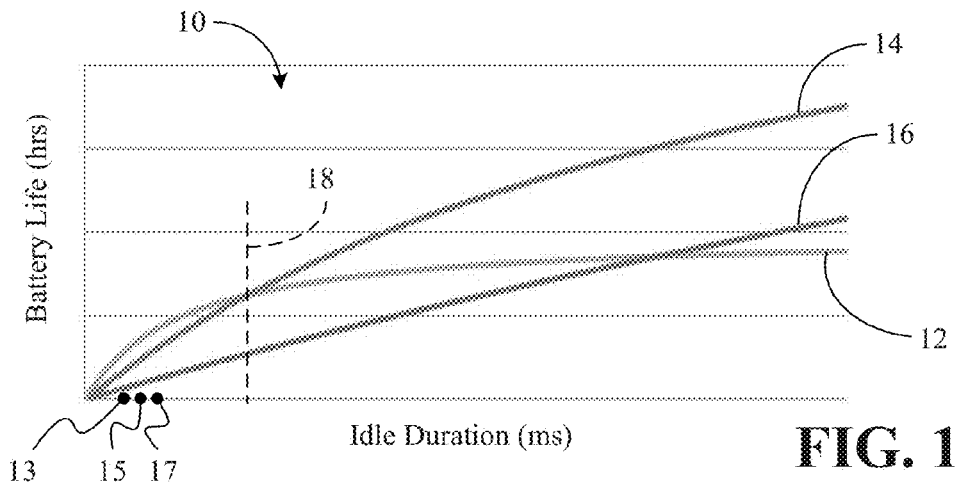
FIG. 1 is a plot of an example of battery life versus idle duration for a plurality of low power states according to an embodiment.

Turning now to FIG. 1, a plot 10 of battery life versus idle duration is shown for a set of low power states for a system such as a platform, device, component, processor, chipset, and so forth. In this regard, many systems may have the ability to transition into and out of multiple low power states in order to achieve energy efficient operation. For example, a processor such as a central processing unit (CPU), chipset, etc., could have multiple idle states (e.g., C1, C2, . . . , Cn), a device such as a network controller might have multiple device idle states (e.g., D0i1, D0i2, . . . , D1, . . . , Dn), and a platform such as a laptop or smart tablet may have multiple active idle states (e.g., S0i1, S0i2, S0i3).

As will be discussed in greater detail, "absolute" energy break-even times may be determined for these low power states with respect to an active operating state of the system, wherein each absolute energy break-even time can generally indicate the amount of time the system would have to remain idle in the selected low power state in order to justify transitioning to and from the low power state in question. In this regard, there may be transition-related power consumption overhead as well as latency overhead that could offset the advantages associated with the reduced power consumption of the low power state itself if the idleness period is not long enough. The plot 10 demonstrates that there may be additional advantages associated with comparing the low power states to one another in order to determine "relative" energy break-even times.

In particular, a shallow state curve 12 may correspond to a relatively shallow low power state (e.g., "S0i1") having an associated power consumption (e.g., 5 mW) that is lower than the power consumption of the active state, and an associated absolute energy break-even time 13 (e.g., 1.4 ms). Similarly, an intermediate state curve 14 can correspond to an intermediate low power state (e.g., "S0i2") having an associated power consumption (e.g., 0.75 mW) that is lower than the power consumption of the shallow low power state and an associated absolute energy break-even time 15 (e.g., 3 ms) that is longer than the absolute energy break-even time 13 of the shallow low power state. Additionally, a deep state curve 16 could correspond to a relatively deep low power state (e.g., "S0i3") having an associated power consumption (e.g., 0.01 mW) that is lower than the power consumption of the intermediate low power state and an associated absolute energy break-even time 17 (e.g., 8 ms) that is longer than the absolute energy break-even time 15 of the intermediate low power state.

In the illustrated example, the shallow state curve 12 and the intermediate state curve 14 have an idleness duration crossing point 18 (e.g., 370 ms). In particular, for idleness durations less than the crossing point 18, the shallow state curve 12 exhibits longer battery life than both the intermediate state curve 14 and the deep state curve 16. Under a conventional approach, the system might be transitioned into either the intermediate low power state for idleness durations between the absolute energy break-even time 15 and the absolute energy break-even time 17, or the deep low power state for idleness durations between the absolute energy break-even time 17 and the crossing point 18 (and beyond). Accordingly, such an approach could yield less than optimum battery life. As will be discussed in greater detail, a relative energy break-even time approach may alternatively be used so that the system can be placed into the shallow low power state for idleness durations between the absolute energy break-even time 13 and the crossing point 18.

In general, increasing the residency in the most optimal low power can significantly reduce the overall platform power consumption while maintaining the same user experience. In this disclosure, the term "system" may be used to refer to platforms, devices, components, processors, and so forth, that support multiple low power states sometimes denoted as S0ix, x=1, 2 . . . n (e.g., in the case of platforms), where each state S0ix can be described by the following three attributes:

a. Transition latency L(i), which may include both entry and resume latency: L(i,enter) and L(i,exit);

b. Power consumption in the low power state P(i); and c. Absolute energy break-even time EBT(i).

Traditionally, when a system makes a decision to enter a lower power state, the upcoming expected idle duration may be compared against the energy break-even time for this state. In particular, a policy may be implemented so that the projected idle duration is longer than the EBT(i) for the system when entering the lower power state S0ix. The EBT(i) may be defined as the minimum time the system stays in the lower power state S0ix, including the entry and exit transition time, to compensate for the cost of entering and exiting this state from the active state. EBT(i) can be calculated as following:

$$L(i)*PR(i) + (EBT(i) - L(i))*P(i) = EBT(i)*Pon \quad (1)$$

$$\Rightarrow EBT(i) = \frac{PR(i) - P(i)}{Pon - P(i)} L(i)$$

Where Pon is the power consumption when the system is active and PR(i) is the power consumption during transition (usually higher than Pon). Note that in the above calculation, the latency L(i) includes both entry latency and resume latency for simplicity. It may be understood that the transition power PR(i) may not be a constant during transition, in which case the average measured value can be used. In cases where the PR(i) equals Pon (i.e., the transition power is the same as active power), the EBT(i) equals the transition latency L(i), in the example shown.

Traditionally, the EBT(i) might be defined and calculated to represent the break-even time of entering the lower power state S0ix as compared to staying in the active state S0. This EBT(i) may therefore be considered an absolute energy break-even time, to differentiate it from the "relative break-even time" rEBT(i) proposed and described herein.

When a system has multiple low power states (e.g., S0i1, ..., S0in), the decision of whether to enter a certain low power state S0i1 might not be based on whether entering S0i1 saves power comparing to remaining in the current active state, but rather based on whether entering S0i1 saves energy as compared to entering any other shallower state, namely, S0im, m<1.

For example, the aforementioned plot 10 of FIG. 1 indicates that when the idle duration is below the crossing point 18 (e.g., ~370 ms), entering S0i2 or S0i3 results in shorter battery life (because more power is consumed) as compared to entering S0i1 instead, although the absolute energy break-even times for S0i2 and S0i3 are much smaller than 370 ms. This condition is because, as already mentioned, the relative energy break-even time rEBT(S0i2) with respect to S0i1 is different from the absolute energy break-even time EBT (S0i2) (i.e., 370 ms vs. 3 ms) in the example shown. When a system enables multiple low power states, comparing the EBT(i) to the expected upcoming idle duration may not be an optimal mechanism to make the decision. Instead, the relative break-even time of entering Si with respect to Sj can be compared against the projected idleness duration. Simply put, the relative energy break-even time rEBT(i|j), may be defined as the minimum time the system should take to transit and stay in the low power state Si for the system to save energy as compared to entering a shallower low power state Sj.

In one approach, the relative energy break-even time rEBT (i|j) may be determined using available absolute break-even time EBT(i) information and power consumption information for the different low power states P(i). In particular, in order to save power by entering state i with respect to a shallower state j for a certain idle duration $T_{sleep}$, the following conditions may be maintained:

$$EBT(i)*Pon + (T_{sleep} - EBT(i))*P(i) \leq EBT(j)*Pon + (T_{sleep} - EBT(j))*P(j) \quad (2)$$

Which yields:

$$T_{sleep} \geq \frac{Pon(EBT(i) - EBT(j)) + (EBT(j)P(j) - EBT(i)P(i))}{P(j) - P(i)} \quad (3)$$

Thus, the relative break-even time rEBT(i|j) may be, $$rEBT(i|j) = \frac{Pon(EBT(i) - EBT(j)) + (EBT(j)P(j) - EBT(i)P(i))}{P(j) - P(i)} \quad (4)$$

Comparing formula (4) to formula (1), for a given low power state, the relative energy break-even time may be very different from the absolute energy break-even time. Indeed, in certain systems, the rEBT(i|j) may be much larger than the absolute EBT(i) for the various low power states, as illustrated in the plot 10 of FIG. 1.

Another example using a processor may illustrate how the rEBT can differ from the EBT. In particular, the difference between EBT and rEBT for a processor could be smaller due to the characteristics of processors, which may provide a significant opportunity to further optimize the processor's energy consumption by making use of rEBT instead of EBT. Consider, for example, a processor that implements the ACPI (Advanced Configuration and Power Interface, e.g., ACPI Specification, Rev. 4.0a, Apr. 5, 2010) C1, C2, and C3 low power states, and has resume latencies of 1 us, 20 us, and 50 us, respectively. These three values may be conveyed to the OS (operating system) through an ACPI table, and in general the OS might multiply this value by a constant factor to estimate the absolute energy break-even time. Thus, approximations of 2 us, 40 us, and 100 us, may be obtained for the EBT values for the C1, C2, and C3 low power states, respectively.

The rEBT, however, may be very different when the power consumption information for the different low power states is considered (e.g., P(C1)=4.4 W, P(C2)=3.4 W, P(C3)=1.1 W), as shown in Table I below.

TABLE I

| State | Power (W) | Latency (us) | EBT (us) | rEBT(i|j) (us) |
|---|---|---|---|---|
| C0 | 8.1 | N/A | N/A | N/A |
| C1 | 4.4 | 1 | 2 | 2 |
| C2 | 3.4 | 20 | 40 | 181 |
| C3 | 1.1 | 50 | 100 | 222 |

Using the techniques described above, the rEBT values may be determined for the processor based on the appropriate EBT values and the power consumption information. For optimal processor energy efficiency, rEBT may be used to select the low power state as shown in Table I. In particular, for idleness periods from 2-181 us, the processor can reside in C1 instead of transitioning to C2 (as may be the case for idleness periods from 2-40 us using the EBT under traditional approaches). Thus, greater energy efficiency can be achieved by the processor remaining in the C1 state even though the projected idleness duration exceeds the EBT for the C2 state. Additionally as the exit latency of C1 is shorter than the exit latency of C2 the overall performance improves while at the same time achieving a lower power consumption.

Figure 2:
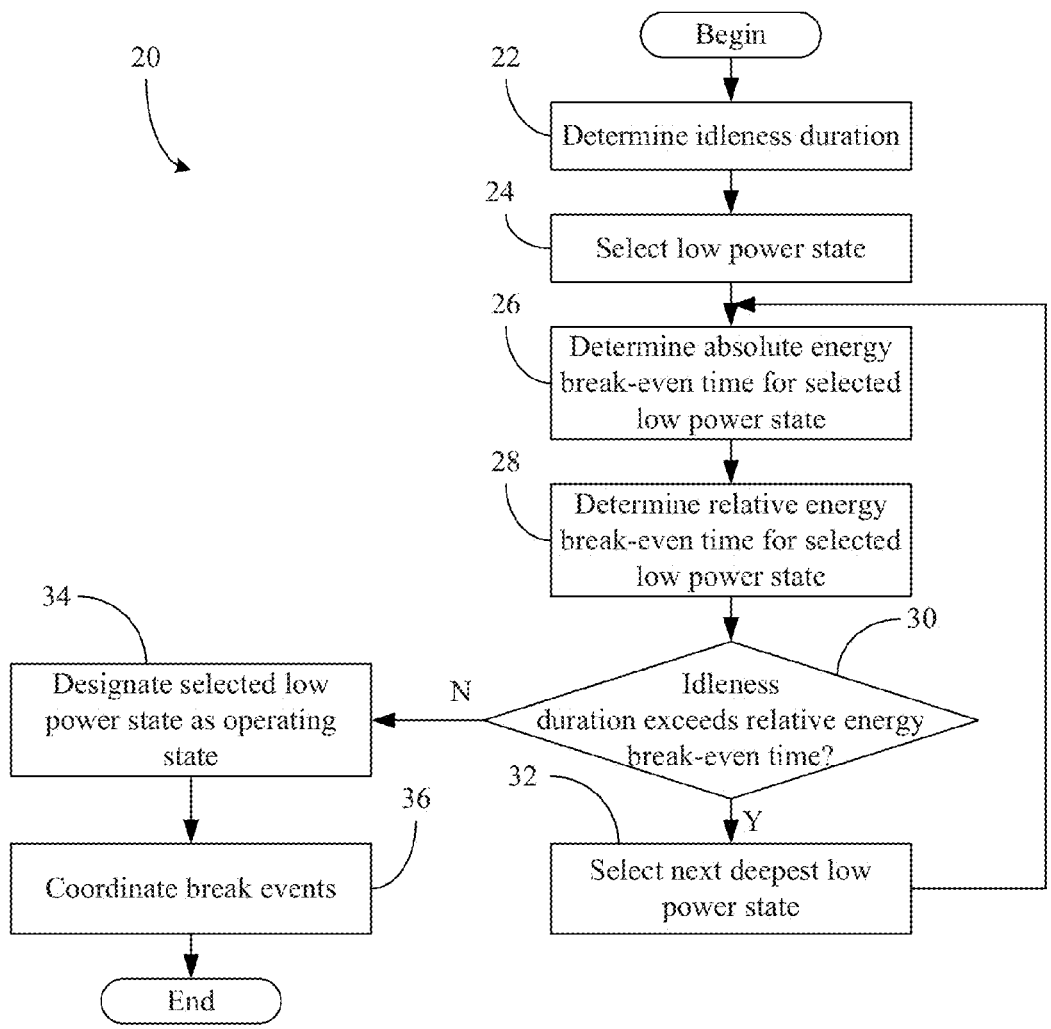
FIG. 2 is a flowchart of an example of a method of selecting operating states for a system according to an embodiment.

FIG. 2 shows a method 20 of selecting operating states for a system. As already noted, the operating states could be platform states, processor states, device states, and so forth, depending upon the type of system. The method 20 may be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof.

Illustrated processing block 22 provides for determining projected idleness duration for a system having a plurality of low power states, wherein one of the low power states (e.g., Si) may be selected for consideration at block 24. Block 26 can determine an absolute energy break-even time (e.g., EBT(i)) for the selected low power state. In one example, the aforementioned formula (1) may be used to make the determination at block 26. Alternatively, the absolute energy break-even time could be estimated and/or retrieved from a table such as an ACPI table. Block 26 may also involve determining the absolute energy break-even time of an intermediate low power state (e.g., EBT(j) for state Sj).

A relative energy break-even time (e.g., rEBT(i|j)) may be determined at block 28 for the selected low power state (e.g., Si) with respect to a shallower low power state (e.g., Sj) based on at least in part the absolute energy break-even time determined at block 26. In particular, the determination at block 28 may involve the use of an expression such as the aforementioned formula (4), an estimation procedure and/or a table lookup. If it is determined at block 30 that the projected idleness duration exceeds the relative energy break-even time, the next deepest low power state can be selected at block 32 and the break-even time determination process may be repeated. Otherwise, illustrated block 34 designates the selected low power state as the operating state for the system.

The issuance of two or more break events may also be coordinated with one another at block 36 based on at least in part the relative energy break-even time. In general, IO (input/output) devices and software applications associated with a platform may generate uncoordinated break events, which can prevent the platform and its components from rapidly entering lower power states and staying in those states for extended periods of time. If, for example, one break event is detected from one event source (e.g., network controller), and another break event is detected from another event source (e.g., audio IO device), the illustrated approach can coordinate issuance of the two break events based on at least in part the relative energy break-even time. In particular, a holding time may be determined based on the relative break-even time, wherein the holding time can be used to defer at least one of the break events. Thus, issuance of the audio IO device break event might be deferred so that it can be issued concurrently with the network controller break event in the example provided without impacting performance.

For example, FIG. 3 shows a first sequence 38 of break events according to an approach that does not coordinate the issuance of break events, and a second sequence 40 that does coordinate the issuance of break events. In particular, the illustrated first sequence enters a relatively deep low power state (e.g., C6) only once at period 42. The second sequence 40, on the other hand, may enter the relatively deep low power state several times at periods 44. The second sequence 40 therefore clearly demonstrates the longer and more deterministic idle durations that may be created using the above-described break event coordination.

Turning now to FIG. 4, a platform 46 is shown. The platform 46 may be part of a mobile platform having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, the platform 46 includes a processor 48, an integrated memory controller (IMC) 50, an IO module 52, system memory 54, a network controller (e.g., network interface card) 56, an audio IO device 58 and a solid state disk (SSD) 60. The processor 48, which may include a core region with one or several processor cores 62, may use a power management unit (PMU) 64 to place its cores 62 and other system components into one or more active and/or idle states based on performance and/or power management concerns, as already noted.

The illustrated IO module 52, sometimes referred to as a Southbridge or South Complex of a chipset, functions as a host device and communicates with the network controller 56, which could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 52 may also include one or more wireless hardware circuit blocks to support such functionality.

The SSD 60 may include one or more NAND chips and might be used to provide high capacity data storage and/or a significant amount of parallelism. There may also be solutions that include NAND controllers implemented as separate ASIC controllers being connected to the IO module 52 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 60 could also be used as a USB (Universal Serial Bus, e.g., USB Specification 3.0, USB Implementers Forum) flash storage device.

The illustrated IO module 52 includes a break-even time unit 66 that is configured to determine absolute energy break-even times and relative energy break-even times for the low power states of one or more systems such as the platform 46, the processor 48, the IO module 52, devices such as the network controller 56, audio 10 device 58, SSD 60, and so forth, as already discussed. The illustrated break-even time unit 66 may also select operating states for those systems based on at least in part the relative energy break-even times. Moreover, the break-even time unit 66 may coordinate issuance of two or more break events based on at least in part the relative energy break-even times, associated hold times, and so forth. The break-even time unit 66 could be implemented elsewhere in the platform 46 such as, for example, in the processor 48 or in one or more of the illustrated devices.

Techniques described herein therefore provide a mechanism for processors such as CPUs and chipsets, devices such as network controllers, and full platforms to enable maximum power saving and energy efficiency by selecting the most appropriate low power state using the relative energy break-even time between low power states and idle duration information. As a result, platforms may optimize residency in the most appropriate low power state and achieve more energy head-room to comply with upcoming more stringent Energy Star, and other equivalent regulations.

While certain embodiments may have been described with regard to specific implementations, variations may be made as appropriate. For example, although certain ACPI low power states have been used for purposes of discussion, other states such as deeper Cx states (e.g., C4, C5 and C6), may also benefit from the techniques described herein. Moreover, while platforms and processors might have been used as examples to illustrate various concepts, methods and benefits of using relative break-even time with idle duration for optimal power management, the architectures and methods can be applied by any system, components or devices that have multiple low power states. Additionally, idle durations can be obtained in different ways, e.g., CPU estimating idle duration based on heuristics, device obtaining the information from relevant scheduler, devices providing the idle duration information to the system, etc. Simply put, the proposed approaches can be used to optimize system power savings irrespective of how the idle duration is obtained.

Embodiments may therefore provide for a computer implemented method in which an absolute energy break-even time is determined for a first low power state with respect to a current state of a system. A relative energy break-even time may also be determined for the first low power state with respect to a second low power state based on at least in part the absolute energy break-even time. The method may also involve selecting an operating state for the system based on at least in part the relative energy break-even time. In one example, the second low power state is shallower than the first low power state. Thus, using relative energy break-even time may lead to the selection of a more appropriate power state that has a shorter exit latency, wherein the shorter exit latency may in turn provide better performance.

Embodiments can also include a non-transitory computer readable storage medium including a set of instructions which, if executed by a processor, cause a computer to determine an absolute energy break-even time for a first low power state with respect to a current state of a system. The instructions may also cause a computer to determine a relative energy break-even time for the first low power state with respect to a second low power state based on at least in part the absolute energy break-even time. In addition, the instructions can cause a computer to select an operating state for the system based on at least in part the relative energy break-even time.

Other embodiments may include an apparatus having logic to determine an absolute energy break-even time for a first low power state with respect to a current state of a system, and determine a relative energy break-even time for the first low power state with respect to a second low power state based on at least in part the absolute energy break-even time. In addition, the logic can select an operating state for the system based on at least in part the relative energy break-even time.

In addition, embodiments can include a platform having a processor and logic to determine an absolute energy break-even time for a first low power state with respect to a current state of the processor. The logic may also determine a relative energy break-even time for the first low power state with respect to a second low power state based on at least in part the absolute energy break-even time. Additionally, the logic may select an operating state for the processor based on at least in part the relative energy break-even time.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
    determining an absolute energy break-even time for a first low power state with respect to a current state of a system;
    determining a relative energy break-even time for the first low power state with respect to a second low power state based on at least in part the absolute energy break-even time; and
    selecting an operating state for the system based on at least in part the relative energy break-even time.

2. The method of claim 1, further including using a power consumption associated with the first low power state and a power consumption associated with the second low power state to determine the relative energy break-even time.

3. The method of claim 1, wherein the second low power state is shallower and has a shorter exit latency than the first low power state.

4. The method of claim 3, further including selecting the second low power state as the operating state if a projected idleness duration is less than the relative energy break-even time for the first low power state.

5. The method of claim 4, wherein the projected idleness duration is greater than the absolute energy break-even time for the first low power state.

6. The method of claim 1, further including:
detecting a first break event from a first event source;
detecting a second break event from a second event source; and
coordinating issuance of the first and second break events to the system based on at least in part the relative energy break-even time.

7. The method of claim 6, wherein coordination of the issuance of the first and second break events includes a determination of a holding time based on at least in part the relative energy break-even time, and a deference of at least one of the first and second break events based on at least in part the holding time.

8. A non-transitory computer readable storage medium comprising a set of instructions which, if executed by a processor, cause a computer to:
determine an absolute energy break-even time for a first low power state with respect to a current state of a system;
determine a relative energy break-even time for the first low power state with respect to a second low power state based on at least in part the absolute energy break-even time; and
select an operating state for the system based on at least in part the relative energy break-even time.

9. The medium of claim 8, wherein the instructions, if executed, cause a computer to further use a power consumption associated with the first low power state and a power consumption associated with the second low power state to determine the relative energy break-even time.

10. The medium of claim 8, wherein the second low power state is to be shallower and is to have a shorter exit latency than the first low power state.

11. The medium of claim 10, wherein the instructions, if executed, cause a computer to select the second low power state as the operating state if a projected idleness duration is less than the relative energy break-even time for the first low power state.

12. The medium of claim 11, wherein the projected idleness duration is to be greater than the absolute energy break-even time for the first low power state.

13. The medium of claim 8, wherein the instructions, if executed, cause a computer to:
detect a first break event from a first event source;
detect a second break event from a second event source; and
coordinate issuance of the first and second break events to the system based on at least in part the relative energy break-even time.

14. The medium of claim 13, wherein coordination of the issuance of the first and second break events is to include a determination of a holding time based on at least in part the relative energy break-even time, and a deference of at least one of the first and second break events based on at least in part the holding time.

15. An apparatus comprising:
logic to,
determine an absolute energy break-even time for a first low power state with respect to a current state of a system,
determine a relative energy break-even time for the first low power state with respect to a second low power state based on at least in part the absolute energy break-even time, and
select an operating state for the system based on at least in part the relative energy break-even time.

16. The apparatus of claim 15, wherein the logic is to further use a power consumption associated with the first low power state and a power consumption associated with the second low power state to determine the relative energy break-even time.

17. The apparatus of claim 15, wherein the second low power state is to be shallower and is to have a shorter exit latency than the first low power state.

18. The apparatus of claim 17, wherein the logic is to select the second low power state as the operating state if a projected idleness duration is less than the relative energy break-even time for the first low power state.

19. The apparatus of claim 18, wherein the projected idleness duration is to be greater than the absolute energy break-even time for the first low power state.

20. The apparatus of claim 15, wherein the logic is to,
detect a first break event from a first event source,
detect a second break event from a second event source, and
coordinate issuance of the first and second break events to the system based on at least in part the relative energy break-even time.

21. The apparatus of claim 20, wherein coordination of the issuance of the first and second break events is to include a determination of a holding time based on at least in part the relative energy break-even time, and a deference of at least one of the first and second break events based on at least in part the holding time.

22. The apparatus of claim 15, wherein the first and second low power states are to include at least one of a platform state, a processor state and a device state.

23. A platform comprising:
a processor; and
logic to,
determine an absolute energy break-even time for a first low power state with respect to a current state of the processor,
determine a relative energy break-even time for the first low power state with respect to a second low power state based on at least in part the absolute energy break-even time, and
select an operating state for the processor based on at least in part the relative energy break-even time.

24. The platform of claim 23, wherein the logic is to further use a power consumption associated with the first low power state and a power consumption associated with the second low power state to determine the relative energy break-even time.

25. The platform of claim 23, wherein the second low power state is to be shallower and is to have a shorter exit latency than the first low power state.

26. The platform of claim 25, wherein the logic is to select the second low power state as the operating state if a projected idleness duration is less than the relative energy break-even time for the first low power state.

27. The platform of claim 26, wherein the projected idleness duration is to be greater than the absolute energy break-even time for the first low power state.

28. The platform of claim 23, wherein the logic is to,
    detect a first break event from a first event source,
    detect a second break event from a second event source, and
    coordinate issuance of the first and second break events to the processor based on at least in part the relative energy break-even time.

29. The platform of claim 28, wherein coordination of the issuance of the first and second break events is to include a determination of a holding time based on at least in part the relative energy break-even time, and a deference of at least one of the first and second break events based on at least in part the holding time.

\* \* \* \* \*